United States Patent
Voigt et al.

(10) Patent No.: US 7,305,520 B2
(45) Date of Patent: Dec. 4, 2007

(54) STORAGE SYSTEM WITH CAPABILITY TO ALLOCATE VIRTUAL STORAGE SEGMENTS AMONG A PLURALITY OF CONTROLLERS

(75) Inventors: Doug Voigt, Boise, ID (US); Hal Woods, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 356 days.

(21) Appl. No.: 10/769,380

(22) Filed: Jan. 30, 2004

(65) Prior Publication Data

US 2005/0172097 A1    Aug. 4, 2005

(51) Int. Cl.
  *G06F 13/14*    (2006.01)
(52) U.S. Cl. ............... 711/112; 709/226; 710/15
(58) Field of Classification Search ........ 711/111–114, 711/161–162; 718/105; 710/15; 709/226
See application file for complete search history.

(56) References Cited

U.S. PATENT DOCUMENTS

| | | | | |
|---|---|---|---|---|
| 6,061,761 A * | 5/2000 | Bachmat | ............... | 711/114 |
| 6,088,766 A * | 7/2000 | Bachmat et al. | ............ | 711/114 |
| 6,189,071 B1 * | 2/2001 | Bachmat | ............... | 711/114 |
| 6,341,333 B1 * | 1/2002 | Schreiber et al. | ........... | 711/114 |
| 6,405,282 B1 * | 6/2002 | Lam et al. | ................. | 711/112 |
| 6,442,650 B1 * | 8/2002 | Bachmat et al. | ............ | 711/114 |
| 6,487,634 B1 * | 11/2002 | Bachmat | ............... | 711/112 |
| 6,584,545 B2 * | 6/2003 | Bachmat et al. | ............ | 711/114 |
| 6,598,129 B2 | 7/2003 | Kanda et al. | | |
| 6,606,697 B1 | 8/2003 | Kawahara et al. | | |
| 6,633,955 B1 * | 10/2003 | Yin et al. | .................. | 711/114 |
| 6,640,281 B2 | 10/2003 | Obara et al. | | |
| 6,647,514 B1 | 11/2003 | Umberger et al. | | |
| 6,654,830 B1 | 11/2003 | Taylor et al. | | |
| 6,658,526 B2 | 12/2003 | Nguyen | | |
| 6,665,700 B1 | 12/2003 | Sugisaki et al. | | |
| 6,694,405 B2 * | 2/2004 | Lam et al. | .................. | 711/112 |
| 6,711,649 B1 * | 3/2004 | Bachmat et al. | ............ | 711/114 |
| 6,718,347 B1 * | 4/2004 | Wilson | ................. | 707/201 |
| 6,766,416 B2 * | 7/2004 | Bachmat | ............... | 711/114 |
| 2002/0156840 A1 * | 10/2002 | Ulrich et al. | ............... | 709/203 |
| 2003/0084241 A1 | 5/2003 | Lubbers et al. | | |
| 2003/0217211 A1 * | 11/2003 | Rust et al. | .................. | 710/305 |

* cited by examiner

*Primary Examiner*—Brian R. Peugh
*Assistant Examiner*—Jared I Rutz

(57) ABSTRACT

A storage system comprises a plurality of storage arrays configurable into a plurality of storage device groups, a plurality of controllers selectively coupled to ones of the storage arrays, a network fabric arranged as a linkage of multiple sets of associated controllers and storage devices, and a processor. The processor is capable of associating the plurality of storage device groups among controllers based on a distribution of performance demand according to controller processor utilization of the individual storage device groups and bandwidth utilization pro-ratable among storage device groups within a set.

30 Claims, 9 Drawing Sheets

STORAGE SYSTEM WITH CAPABILITY TO ALLOCATE VIRTUAL STORAGE SEGMENTS AMONG A PLURALITY OF CONTROLLERS

BACKGROUND OF THE INVENTION

Organizations that use information technology increasingly operate in a challenging environment of accelerating change and disruption. Increasingly adaptive enterprises meet these challenges by using information technology infrastructures that function in the manner of utilities in which the service provided, rather than the components performing the service, is the most important factor in configuring a system.

In an adaptive enterprise, information technology service levels match the flow of real-time business activities using low-cost, dependable, reliable, and scalable services that are available and dynamically-mapped to meet needs during peak activities and lulls. To operate proficiently as an adaptive enterprise, information technology services can respond rapidly to changing internal and external business circumstances, supplying continuous, secure computing and storage services that are protected and optimized using automated, intelligent management operations and a capability to discover, allocate, optimize, and de-allocate resources including servers, network components, storage elements, and application services from predefined "pools" of components.

Resource virtualization is the abstraction or virtualization of server, storage, and network resources to attain dynamically available resources for sharing by information technology services both inside and outside an organization without disturbing or disrupting access to data of other applications. Server virtualization enables horizontally and vertically scaled server environments, enabling optimized utilization, improved service levels, and reduced management overhead. Network virtualization is enabled by intelligent routers, switches, and other networking elements supporting virtual local area networks (LANs). Virtualized networks increase security and can support unforeseen spikes in customer and user demand. Storage virtualization can be based in servers, networks, or arrays and improves utilization of storage subsystems, reduces administration costs, and protects valuable data.

A system is virtualized by separating logical functions of the server, storage, and network elements from physical functions. For example, all servers, storage, and network devices can be aggregated into independent pools of resources. Some elements may even be further subdivided, for example into server partitions, storage logical units (LUNs), and the like, to give an even more granular level of control. Elements from resource pools can be allocated, provisioned, and managed—either manually or automatically, to adapt to changing needs and priorities of business.

In a system using storage virtualization, pooling of physical resources is enabled at various levels in a storage hierarchy. In array controllers, virtualization allows physical capacity to be allocated more efficiently and dynamically. Virtualization of networked storage enables higher availability, better utilization, and centralized management of network storage device groups such as Storage Area Network (SAN)-attached array controllers or network-attached storage (NAS) files servers. Server-based utilization pools physical capacity for both SAN and direct-attached storage (DAS) within the context of a single server.

Storage virtualization involves formation of an abstraction layer between physical storage devices and logical volumes consumed by applications. Abstraction hides details of the storage infrastructure from servers, simplifying the overall management environment. Resource pooling hides physical details of data location, creates subsets of resources for protection, and aggregates resources for higher bandwidth, capacity, and/or availability. Virtualization abstracts storage capacity by mapping storage capacity providing elements, such as physical devices or logical units (LUNs), into a logical space, and creating logical devices that are presented to applications, erasing physical boundaries, creating pools of capacity that can be managed and accessed according to need.

Storage virtualization simplifies storage management by automating addition, allocation, and re-allocation of storage resources to the infrastructure. Storage virtualization also improves storage utilization by ensuring that an appropriately configured storage environment maps to the application and data requirements. Virtualization also relieves the burden of significant pre-allocation of storage capacity to meet growing or peak demands. Storage virtualization also enables storage services across heterogeneous environments, resulting in simplified management and improved utilization of existing resources.

Many conventional primary storage systems use disk arrays to assure high availability of data. Primary data transfer and processing capability in the array resides on one or more controllers. Some systems are moderate in size with exactly two controllers for fault tolerance. Other systems have larger arrays with more than two controllers for higher performance. Unfortunately, arrays with many controllers tend to have a much higher entry cost than smaller, more modular arrays.

As system capacity or performance requirements increase, a common upgrade is growth from two or more controller systems to larger systems without downtime. Growth occurs when either performance or capacity demands exceed the capability of one controller pair or array. A common expansion involves the addition of controllers or arrays to a datacenter and, if necessary, moving data between arrays to balance work across controllers. Data movement is imposed to balance load across controller pairs because each disk is directly connected to at most two controllers within one array.

One problem of conventional storage arrays in which each disk is connected to exactly two controllers is that the association of disk to controller pair cannot be changed. The controller/disk combination is unable to adapt to change without data movement that consumes both time and resources. Expansion of controller resources to relieve performance bottlenecks generally demands addition of disks, as well as additional controllers. Since disks have a restrictive physical association with one controller pair, bottlenecks cannot be alleviated in the controller pair without moving data. Data movement, while potentially on-line, consumes time and resources, therefore unsuitable as a response to frequent, periodic, or short-term performance or capacity burdens. Consequently, a storage system has difficulty responding to growth beyond a single array. Furthermore, the storage system, in the event of a failed controller or controllers, has difficulty sustaining performance and availability. Also, the storage system cannot easily optimize performance for periodic changes in demand.

SUMMARY

In accordance with an embodiment of the disclosed system, a method allocates control of virtual storage segments in a storage system among a plurality of controllers. The storage system is arranged as multiple sets of associated controllers and storage devices. The method comprises determining performance demand among a plurality of storage device groups, distributing performance demand values according to controller processor utilization of the individual storage device groups and bandwidth utilization pro-ratable among storage device groups within a set, and associating the plurality of storage device groups with controllers based on the performance demand value distributions.

BRIEF DESCRIPTION OF THE DRAWINGS

Embodiments of the invention relating to both structure and method of operation, may best be understood by referring to the following description and accompanying drawings.

DETAILED DESCRIPTION

Figure 1:
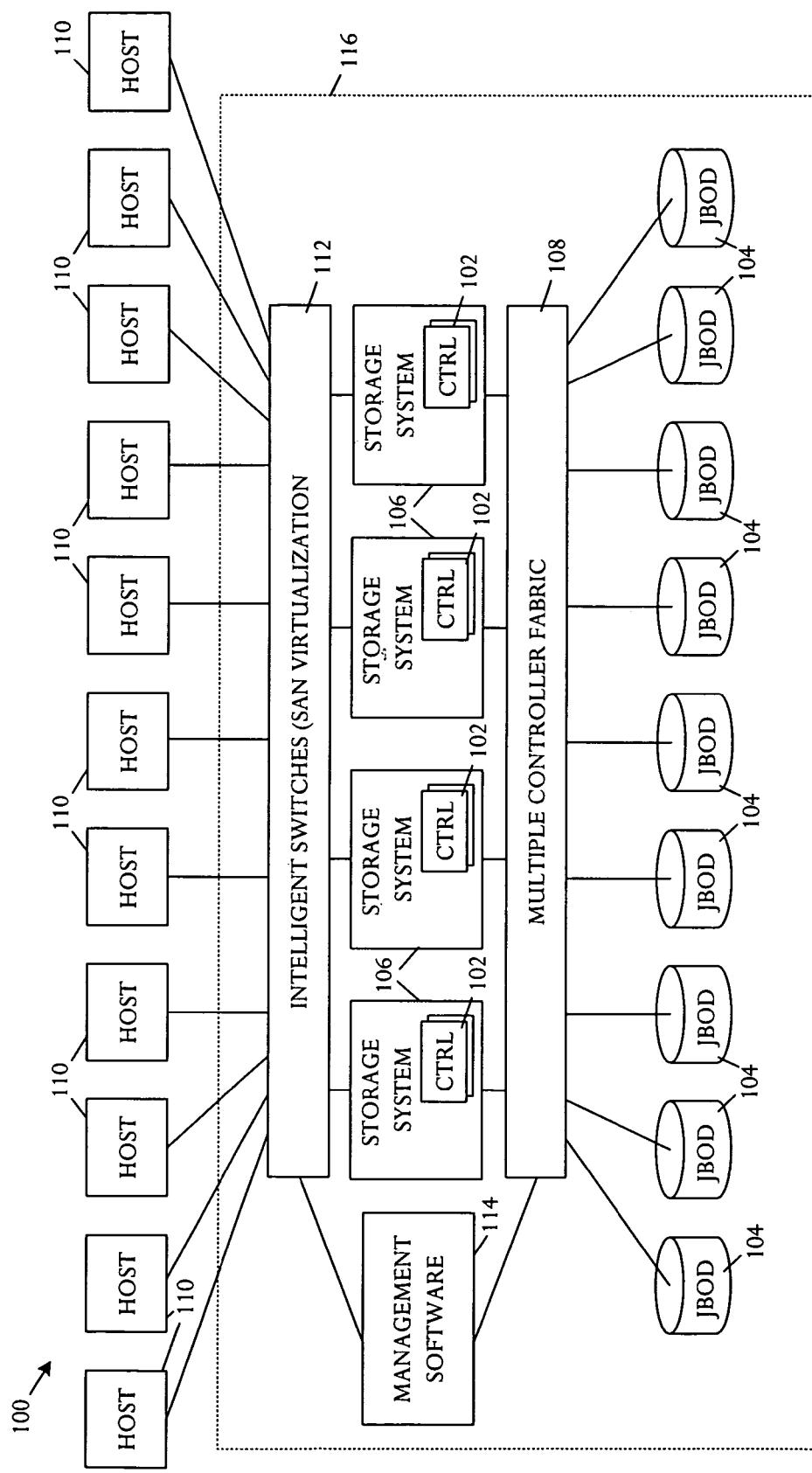
FIG. 1 is a schematic block diagram that depicts an embodiment of a storage system capable of allocating control of virtual storage segments among a plurality of controllers.

To enable system expansion while avoiding data movement between storage devices, an illustrative system forms a network fabric among multiple array controller pairs and a set of storage devices behind the controller pairs. In the illustrative system, the controller pairs are mutually capable of accessing storage devices from other controller pairs. The illustrative system can include a method of dividing responsibility among controllers, enabling flexible shelf management and extended storage device access. The illustrative system can implement a method of moving control and/or data transfer functions related to a group of storage devices between controllers and arrays without moving data. The illustrative system can implement a general method of determining how control and/or data transfer functions related to multiple storage device groups are to be delegated across multiple controllers or arrays in the system.

Conventional systems incapable of the functionality depicted herein utilize data movement between storage devices. Load balancing determinations are performed without the capabilities of automated algorithms that account for multiple-controller fabric utilization, controller bandwidth utilization, and controller memory utilization.

In contrast, the systems illustrated herein increase the ability of groups of modular storage arrays to match or exceed load balancing flexibility of conventional monolithic arrays with respect to the operation of controllers attached to storage devices. In the illustrative systems, a network fabric configuration, for example a limited configuration fibre channel fabric is placed behind a group of arrays so that storage device related activity can be shifted between controllers without moving data.

Using the illustrative systems and methods, expansion of controller resources to relieve performance bottlenecks no longer requires addition of storage devices as well as additional controllers. Storage devices have expanded physical connections to multiple controller pairs so bottlenecks in the controller pair can be alleviated without moving data. Since data movement is avoided, rebalancing controller load becomes a suitable response to frequent, periodic, or short-term performance or capability burdens.

The illustrative systems and methods enable load balancing decisions using automated algorithms to account for multiple controller fabric utilization, controller bandwidth utilization, and memory utilization. Storage devices in one storage shelf can be associated with any controller pair in a group connected to the fabric. Performance can be re-balanced within a short time, for example minutes, of a controller failure. The rapid response is useful because a common array configuration has two controllers including the failed controller and a remaining active controller. The remaining active controller performs the work of both controllers without the benefit of write-back caching. The array with the failed controller can easily become the weak link in the performance of a multiple-array application, forcing the entire application to run at half of normal performance. Rapid re-balancing can redistribute the work of the array with the failing controller across other arrays, significantly reducing performance degradation. In contrast, conventional systems do not attempt workload redistribution since such redistribution can take a longer time to rebalance load than the time to repair the controller, including transit time.

In accordance with some embodiments, the illustrative systems and methods enable retuning after adding controllers in which logical units (LUNs) and storage device groups can be attached to new controllers with the new controllers engaged immediately. In contrast, conventional systems copy data, possibly resulting in hours of movement time.

In accordance with some embodiments, controller bandwidth can be added for backup. During backup operations, extra controller bandwidth can be allocated to the operation, enabling rotation between storage device groups. In contrast, in conventional systems, parts of LUNs can be copied, possible doubling SAN backup activity.

In accordance with some embodiments, the illustrative systems and methods can be utilized to amortize storage device shelf growth. Any controller pair can use any storage device so that the benefit of a new storage device shelf can be shared across the system.

Referring to FIG. 1, a schematic block diagram depicts an embodiment of a storage system 100 capable of allocating control of virtual storage segments among a plurality of controllers 102. The storage system 100 is arranged as multiple sets of associated controllers 102 and storage devices 104. The storage system 100 includes multiple controllers 102 in one or more storage subsystems 106. In an illustrative embodiment, the storage subsystems 106 can be Enterprise Virtual Array™ storage subsystems that are manufactured and marketed by Hewlett Packard Company™ of Palo Alto, Calif. The controllers 102 perform aggregated management functions for managing storage in a plurality of storage devices 104, allocated into storage device groups. In the illustrative embodiment, the storage subsystems manage information stored on a plurality of storage devices 104 in a storage device shelf or Just a Bunch of Disks (JBOD) configuration via a multiple controller fabric 108, for example an array of back-end switches. One or more host computers 110 can communicate with the storage subsystems 106 via a bank of intelligent switches 112 using Storage Area Network (SAN) virtualization. Management software for example executing in a device such as a management appliance 114 coordinates operations of the intelligent switches 112, the multiple controller fabric 108, and/or the storage subsystems 106. Alternatively, the management software can execute in other processors in the system 100, such as in the storage subsystems 106, the hosts 110, or other suitable devices. The management controller handles operations including controller striping and cache aggregation via control of the intelligent switches 112. Management software manipulates the intelligent switches 112 to configure transparent multiple-controller accessing. On the multiple controller fabric 108, management capabilities include load balancing among the storage devices.

The storage systems 106 include sets of controllers 102 associated with specific storage devices 104. In contrast, storage device groups are a logical association of any combination of storage devices 104 managed by any controller 102.

The intelligent switches 112, storage systems 106, multiple controller fabric 108, and storage devices 104 are shown arranged in a storage vault 116. The storage vault 116 can be a storage system contained within a single cabinet or multiple cabinets, in a single location or building, or distributed geographically.

In various embodiments, one or more rules and conditions have bearing on aspects of methods for managing storage and moving control for a group of storage devices between controller pairs. For example, storage devices, such as disks, can be grouped to facilitate Redundant Array of Independent Disks (RAID)-style redundancy algorithms. Storage device group membership is generally determined according to algorithms resident in the controller 102 currently in control of a storage device group. Controller memory resources can be administered as virtual slots in the controller currently in control of the storage device group.

The individual virtual slots can include battery-backed memory that is mirrored to another controller such that continuous data access in the event of controller failure does not require storage device group movement.

If no storage device group movements are in progress then at least one virtual slot is available in the system 100 with sufficient capacity to accommodate the largest storage device group in the system.

In many installations, the network that spans arrays may not exhibit full cross-sectional bandwidth due to the expense of purchasing resources that may be only infrequently warranted. The network can be modeled as multiple sets of associated controller pairs and storage device shelves. The bandwidth within one of the sets is assumed to be adequate for access to all of the storage devices in the set. The bandwidth between the sets, however, is generally limited. Optimization algorithms can be simplified if the bandwidth between each controller and the storage devices in the controller's set is uniform across the system and the internal bandwidth of a controller can accommodate full utilization of all external bandwidth impinging on the controller.

Generally, interactions with a storage device or group of storage devices, for example a disk or disk enclosure, other than support of access to data or metadata contained on the disk involve a controller in the same set as the storage device, including interaction with associated components. For example, the controller manages interactions with associated storage device shelf components such as environmental monitoring units. Failure information related to a storage device may appear in any controller depending on the manner of detection of the information. The information is correlated by higher level management software.

New storage devices are generally first discovered by a controller in the same set as the storage devices. The associated controller announces availability of the storage device to a system-wide storage device pool management utility that enables or automates assignment to a device group. The process of adding the device to the group is performed by the controller currently in charge of the group.

Figure 2:
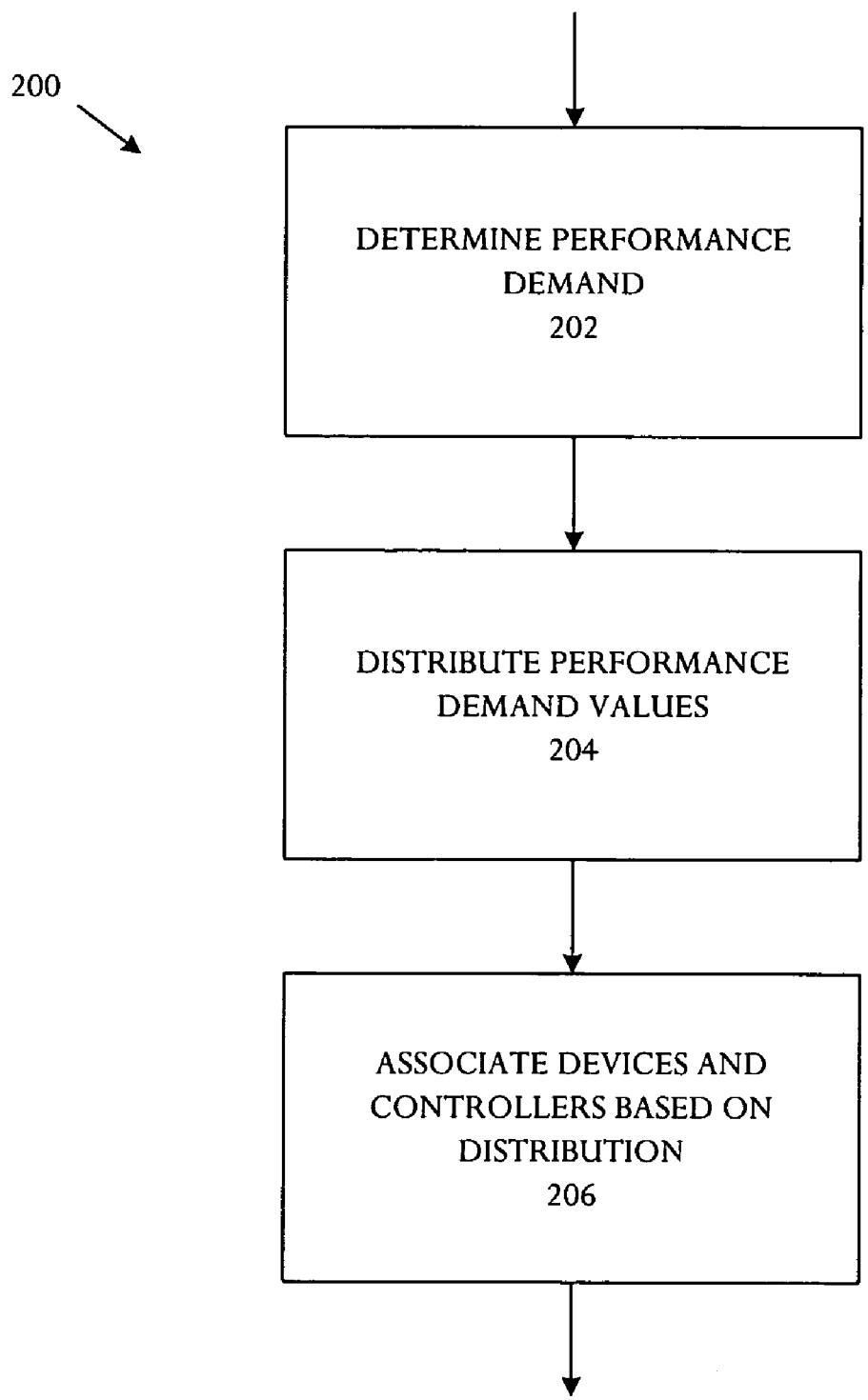
FIGS. 2, 3, 4, and 5 depict flow charts illustrating several embodiments of a method for allocating management responsibility over storage device groups among a plurality of controllers.

Referring to FIG. 2, a flow chart illustrates a method for allocating management responsibility over storage device groups among a plurality of controllers 200. The method comprises determining performance demand among a plurality of storage device groups 202. In various conditions and for particular system configurations, various techniques can be used to determine the performance demand. Performance demand can be measured or estimated. Performance demand parameters may be selected from among one or more of data transfer bandwidth, operation throughput in operations per unit time, and others. Processor metrics may be read from registers or memory in processors that support performance monitoring. Estimates may incorporate enumeration of performance demand as a proportion of per-storage device throughput and/or evaluation of implemented upstream workload management parameters.

The method further comprises distributing performance demand values 204. The distribution is based according to controller processor utilization of the individual storage device groups and bandwidth utilization. Resource utilization is pro-ratable among storage device groups within a set.

The method also comprises associating the plurality of storage device groups with controllers based on the performance demand value distributions 206.

Figure 3:
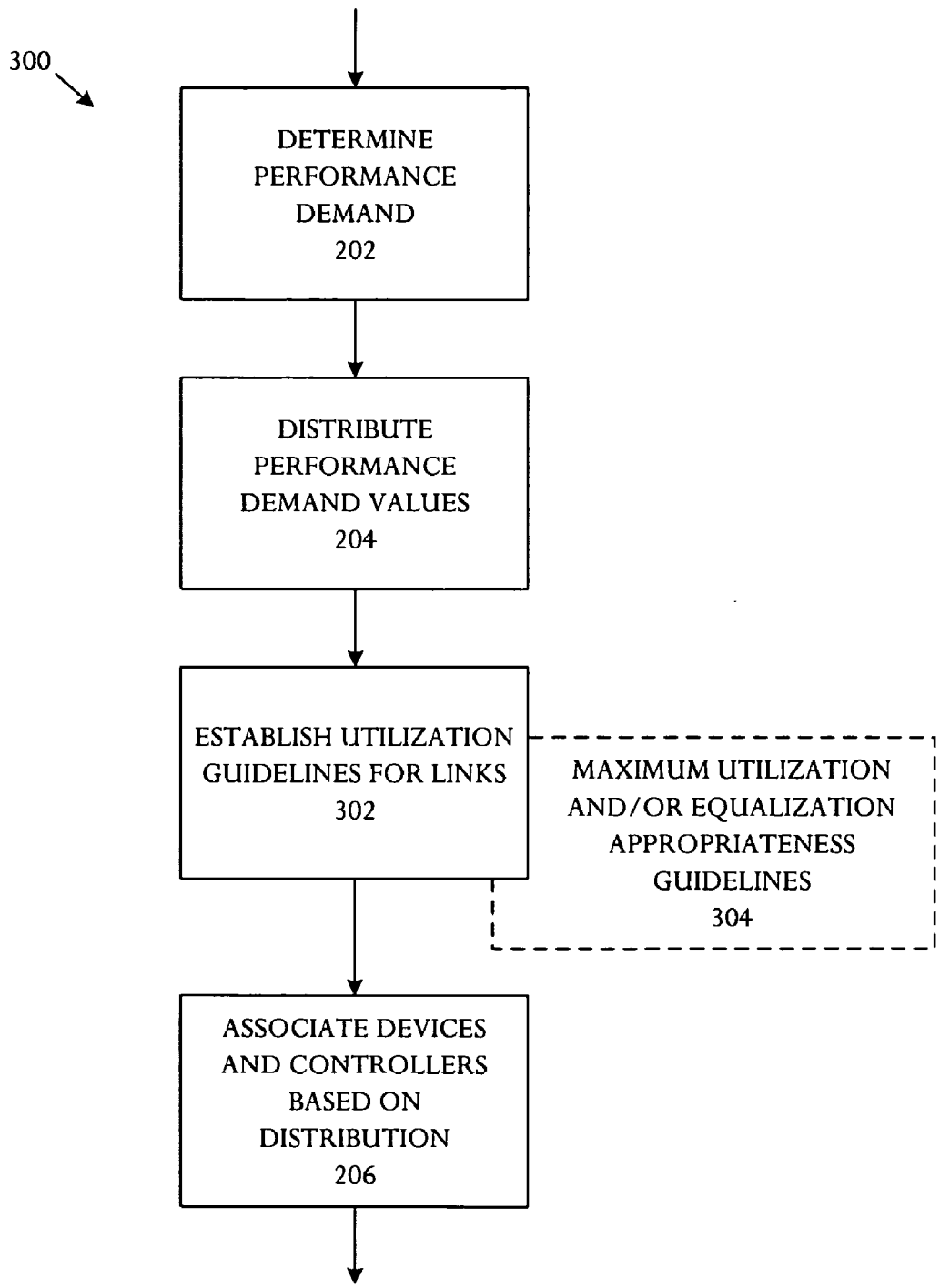

Referring to FIG. 3, a flowchart depicts an alternative embodiment of a method for allocating management responsibility over storage device groups among a plurality of controllers 300. The method includes the actions depicted in FIG. 2 and adds the actions of establishing utilization guidelines for controller-processor and inter-set communication 302. In some embodiments the guidelines can include guidelines for maximum utilization targets and/or appropriateness of equalization across controller processors 304.

Figure 4:
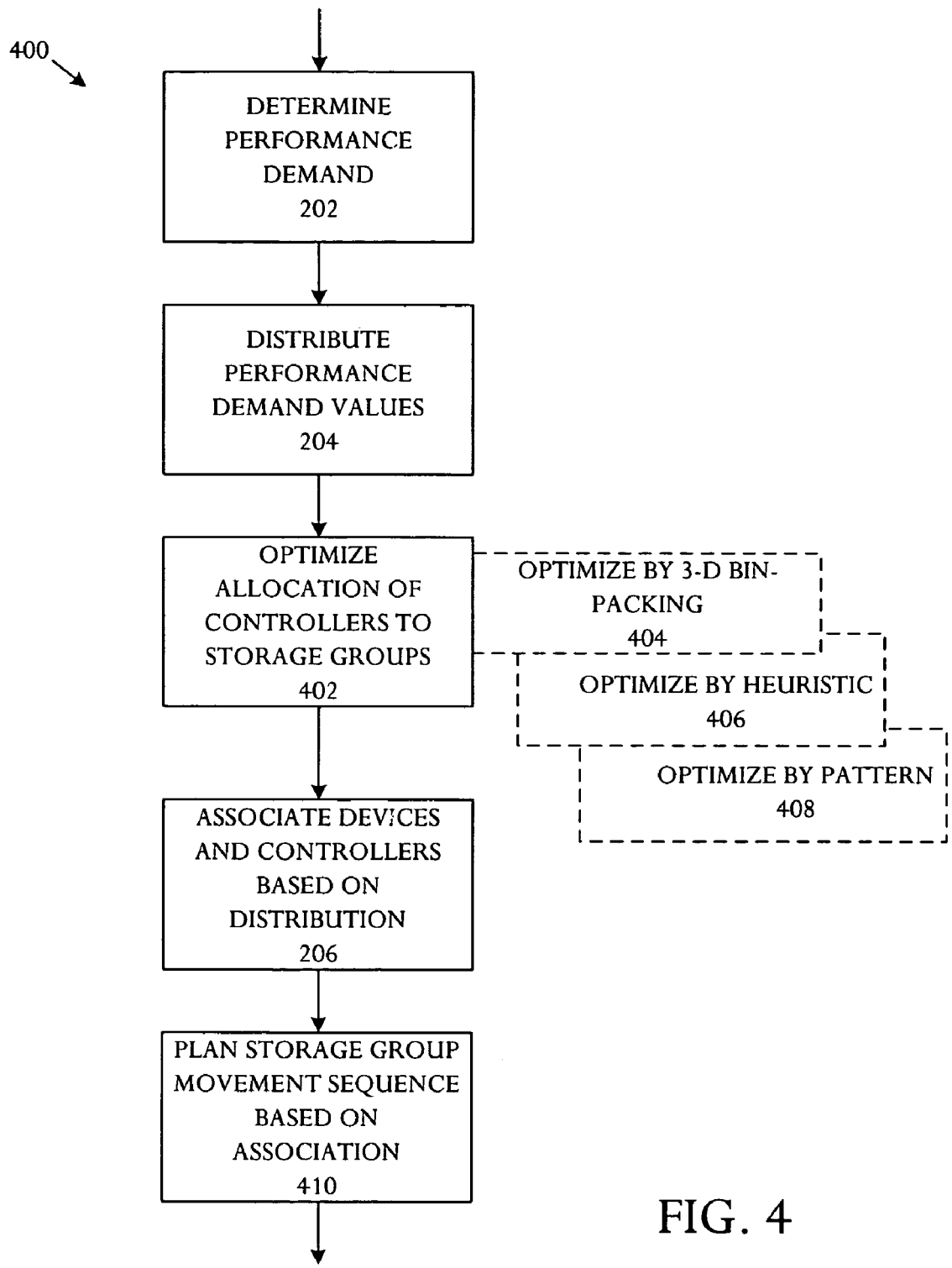

Referring to FIG. 4, a flowchart depicts an alternative embodiment of a method for allocating management responsibility over storage device groups among a plurality of controllers 400. The method includes the actions depicted in FIG. 2 and adds the actions of optimizing the allocation of controllers and storage device groups 402 using one or more techniques. In some embodiments or conditions, a three-dimensional bin-packing technique optimizes the allocation 404. The three dimensions can be defined as virtual slots, controller processor utilization, and inter-set link utilization. Conventional bin-packing techniques are well-known to those having ordinary skill in the art. In some embodiments or conditions, bin-packing techniques may be omitted or may be determined to be too computationally-intensive for a particular application or circumstances. In lieu of bin-packing or other computational techniques, a custom heuristic algorithm 406 can be used based on experience or experimental evaluation. In other embodiments or conditions, the allocation of controllers and storage device groups can be optimized from a set of pre-planned controller-to-storage-device-group association patterns 408.

Based on the determined association, the method can plan a sequence of storage device group movements that advance the configuration from a current state to the determined state 410.

Figure 5:
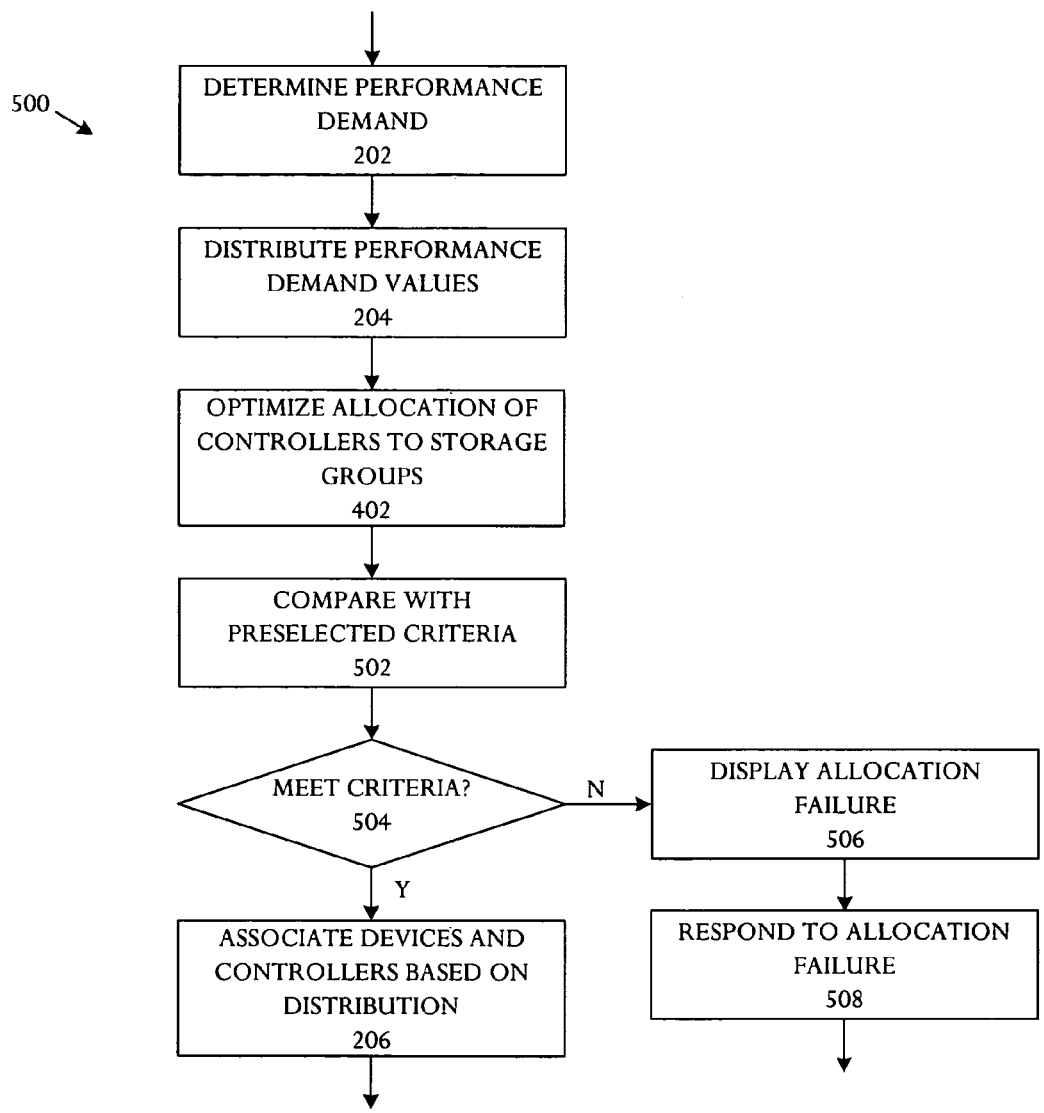

Referring to FIG. 5, a flowchart depicts an alternative embodiment of a method for allocating management responsibility over storage device groups among a plurality of controllers 500. The method includes the actions depicted in FIG. 4 and adds the actions of determining whether a storage device group to controller allocation meets preselected criteria 502. If the criteria are met 504, the association of controllers and storage devices groups is allocated 206. Otherwise, no storage device pattern meets the criteria and the system indicates allocation failure 506, responding with one or more actions 508. Possible actions include adding controllers, adding inter-set bandwidth, adding storage devices, and reconfiguring storage device groupings by moving data. One or more of the actions may be pursued.

In some embodiments, the association of storage device groups to controllers may be graded according to multiple criteria and classified accordingly. If performance is not substantially better than the previous performance, a message indicating the condition may be generated. A response may be undertaken, or no action may be pursued depending on whether any service level problem exists.

Upon optimizing the allocation of controllers and storage device groups, the method can plan a sequence of virtual storage segment movements that advance from the current state to the optimized state.

Figure 6:
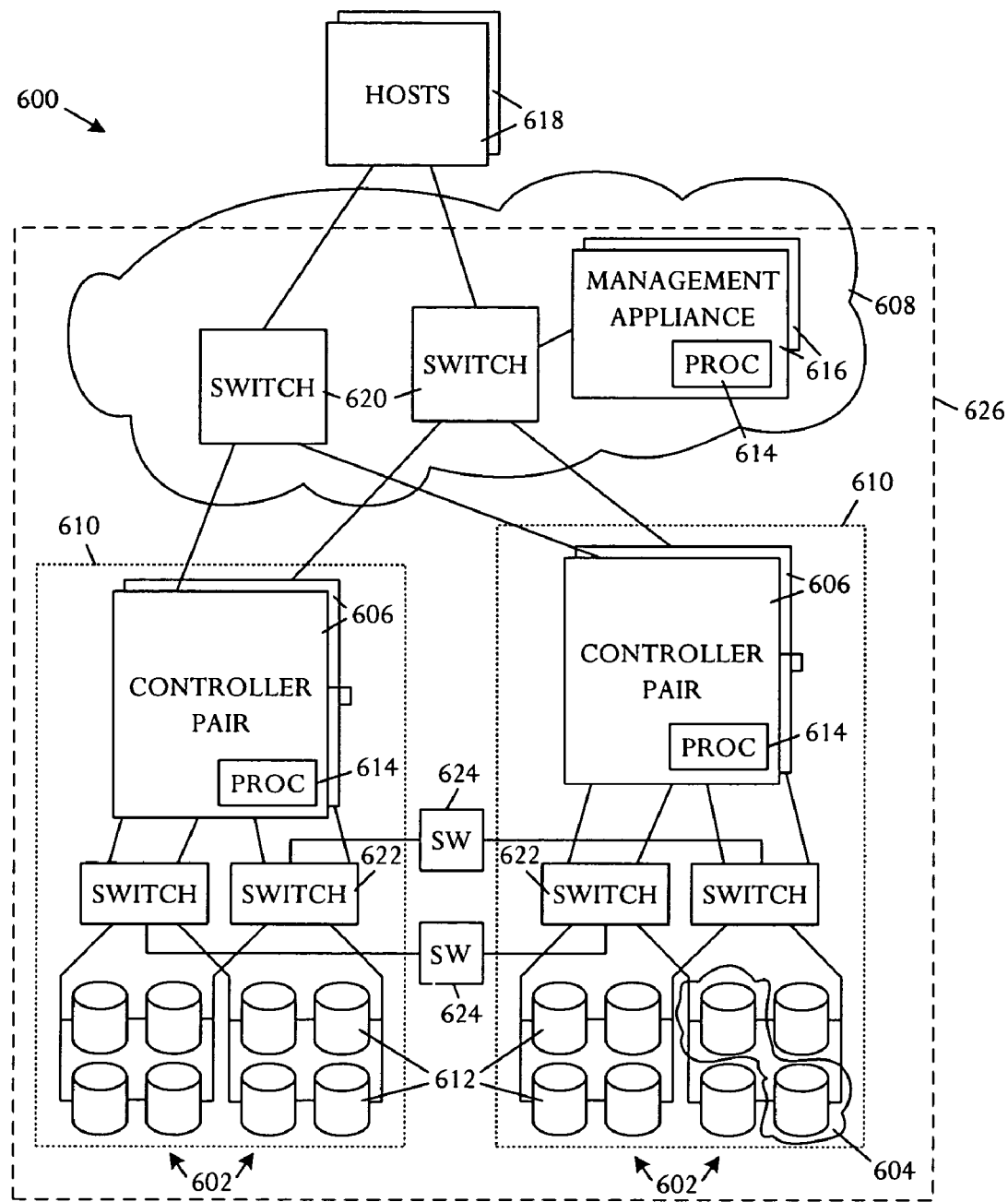
FIG. 6 is a schematic block diagram showing an embodiment of a storage system with capability to allocate resource management.

Referring to FIG. 6, a schematic block diagram illustrates an embodiment of a storage system 600 with capability to allocate resource management. The storage system 600 comprises a plurality of storage arrays 602 that are configurable into a plurality of storage device groups 604 and a plurality of controllers 606 selectively coupled to the individual storage arrays 602. A device group 604 is a logical construct representing a collection of logically defined storage devices having an ownership attribute that can be atomically migrated. The storage system 600 forms a network fabric 608 arranged as a linkage of multiple sets 610 of associated controllers 606 and storage devices 612. The individual sets 610 of associated controller pairs and storage shelves have a bandwidth adequate for accessing all storage arrays 602 in the set 610 with the bandwidth between sets being limited. In some embodiments, all interaction with a storage element other than support of access to data or metadata contained on the storage element involves a controller 606 in the same set as the storage element.

The storage system 600 further comprises a processor 614 that can associate the plurality of storage device groups 604 among controllers 606 based on a performance demand distribution based on controller processor utilization of the individual storage device groups 604 and bandwidth utilization that is pro-ratable among storage device groups 604 within a set 610.

In the illustrative storage system 600, the plurality of controllers 606 are configured as a plurality of controller pairs with a storage array 602 having a restrictive physical association with one controller pair. The plurality of storage arrays 602 are grouped for Redundant Array of Independent Disks (RAID)-style redundancy algorithms with group membership determined according to algorithms resident in the controller 606 that is currently in control of the group 604. A controller's internal bandwidth is sufficient to accommodate full utilization of all external bandwidth impinging on the controller.

Controller memory sources can be administered as virtual slots for placement of group-related control and data information. In some embodiments, battery-backed memories are included in the virtual slots. A process executable in a processor 614 mirrors information in the battery-backed memories from a primary controller to a secondary controller to maintain continuous data access in conditions of a controller failure event without storage device group movement. At least one virtual slot is sufficiently large to accommodate the largest storage device group 604 is available when no storage device group movement is in progress.

In various embodiments and conditions, the processor 614 utilized for storage management may reside in various devices such as the controllers 606, management appliances 616, and host computers 618 that interact with the system 600. The storage system 600 includes other control elements includes intelligent switches 620 above the arrays 602 and lower network switches 622. The hosts 618 can communicate with one or more storage vaults 626 that contain the storage arrays 602, controllers 606, and some of the components within the network fabric 608.

The illustrative storage system 600 has multiple capabilities such as maintaining a single view of management, deploying logical units (LUNs) across arrays, moving LUNs between arrays, and decoupling storage device and controller scaling. The capabilities can be controlled in various levels of the storage system 600. For example the management appliance 616 resides at a level that facilitates maintenance of a single view of management by applying management actions to groups of LUNs and arrays.

Deployment of LUNs across arrays can be managed in a data path agent above the arrays, for example in the intelligent switches 620 in the network fabric 608. LUNs can be deployed across arrays by routing commands to the appropriate LUNs and by LUN striping. Striping is a technique used in Redundant Array of Independent Disks (RAID) configurations in which the storage space of each drive is partitioned into units ranging from a sector of 512 bytes up to several megabytes. The stripes of all drives are interleaved and addressed in order. LUN deployment across arrays can be managed by striping level N LUNs across level N+1 LUNs, for example. The technique can be used to apply resources of multiple arrays to one host level LUN.

Movement of LUNs between arrays can be managed by the management appliance 616 and the intelligent switches 620, for example, to enable on-line controller load leveling without moving data. The capability to move LUNs can eliminate excess storage device enclosures while adding controller resources. The management appliance 616 can enable LUN movement by applying management actions to groups of LUNs and arrays. The management appliance 616 can also copy data during LUN movement. The intelligent switches 620 facilitate consistent data access during LUN movement.

Decoupling of the storage devices and controller scaling can be managed by the management appliance 616, the intelligent switches 620, the controllers 606, and the lower drive network switches 622. The technique can be used to enable on-line load leveling across controllers 606 without moving data, apply additional controllers 606 to the storage system 600 even without adding drive enclosures, and enables physical drives to be reallocated to shift available storage capacity. The management appliance 616 can coordinate and track LUN and storage device group movements, control sequencing of work redistribution actions, and apply management actions to groups of LUNs and arrays. Intelligent switches 620 in the data path agent above the arrays can route commands to the appropriate LUNs, manage striping of LUNs presented by the intelligent switches 620 across LUNs presented at the set 610 level, and manage queues to avoid disruption during movement. The controllers 606 can perform several functions including packaging storage device groups with metadata, supplying storage device group movement primitives, and perform re-initialization and failure recovery even during data movement. The lower storage device network 622 is connected by an inter-set link 624 and can supply controller port-specific views of storage device groups and supply cross-sectional bandwidth to alleviate bottlenecks without moving data. In the illustrative embodiment, the inter-set link 624 is composed of inter-set switches coupling pairs of switches in the lower storage device network 622. The lower storage device network 622 also supports selection of a network configuration and support secure discovery and recovery.

The bandwidth of the connections between switches in the inter-set link 624 and the lower storage device network 622 may be uniform or variable. For example, a system 600 may commonly include a variety of storage array or storage system components with different performance capabilities, and may have varying legacy of usage and capacity. Part of the optimization process for matching system components and software to storage system usage can be to select performance, including bandwidth, criteria for the inter-set links 624.

In accordance with additional embodiments, the storage system 600 includes the plurality of storage arrays 602 configurable into the plurality of storage device groups 604, the plurality of controllers 606 selectively coupled to particular storage arrays 602, the network fabric 608 arranged as a linkage of multiple sets of associated controllers and storage devices, and the communication linkage 624 among the plurality of storage arrays across set boundaries.

The storage system 600 includes one or more processors 614 that can execute from various levels of the system to implement scaling of controllers independently from storage devices. One process that is executable in a processor 614 determines performance demand among a plurality of storage device groups 604 by measuring performance demand including measurements of data transfer bandwidth and/or operations executed per second. In other embodiments or operable in other conditions, a process can determine performance demand among a plurality of storage device groups 604 by estimating performance demand including enumerating performance demand as a proportion of per-storage device throughput and/or evaluating implemented upstream workload throttling parameters.

In some embodiments, the storage system 600 can further include a process executable in a processor 614 that optimizes the allocation of controllers and storage device groups. In some examples and conditions, a process is included that allocates storage using three-dimensional bin-packing techniques with the dimensions defined as virtual slots, controller processor utilization, and inter-set link utilization. In some embodiments and/or conditions, a process can be included that executes in a processor 614 that optimizes the allocation of controllers and storage device groups using a custom heuristic algorithm. In some circumstances, a process optimizes the allocation of controllers and storage device groups using selection from among a set of pre-planned controller to storage device group association patterns.

The illustrative block diagram depicts a storage vault 626 containing two sets 610 simply for facility in understanding. Any number of sets 610 can be contained within a storage vault 626, and multiple storage vaults 626 may be interconnected. The storage vault 626 may include a single system enclosure or multiple enclosures, and may be local to a particular site, or distributed geographically.

Figure 7:
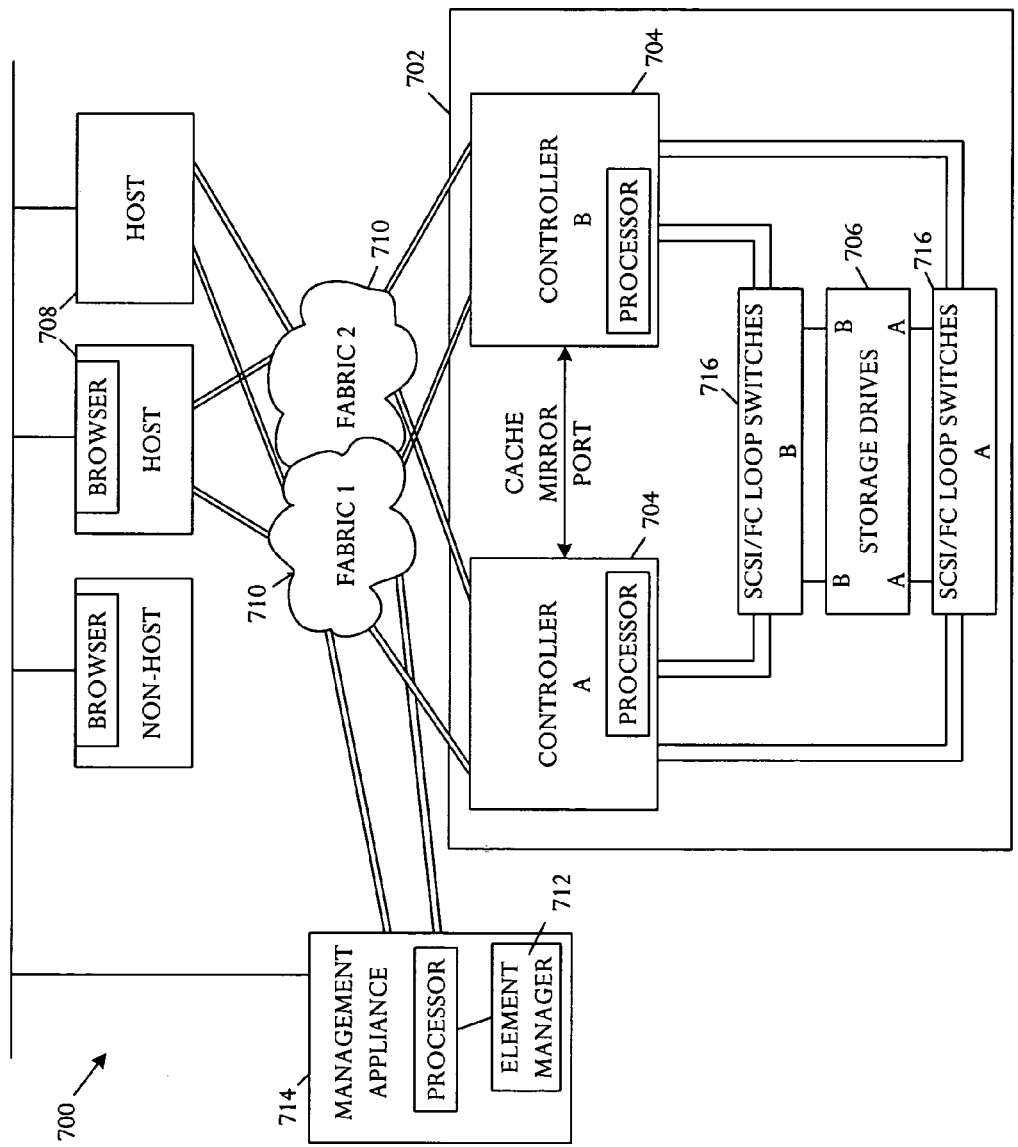
FIG. 7 is a schematic block diagram depicting an embodiment of a storage system that can be used to implement the disclosed technique for allocating resource management.

Referring to FIG. 7, a schematic block diagram shows an embodiment of a storage system 700 that can be used to implement the disclosed technique for allocating resource management. The storage system 700 includes multiple storage devices 702, such as a disk array, that includes storage drives and controllers of the drives. The depicted storage device 702 includes two controllers 704 that are mutually connected to a storage drives 706, for example an array of disk drives. The storage devices 702 communicate information including data and commands among many host systems 708 via one or more network fabrics 710. The depicted system includes an element manager 712, which resides on a management appliance 714, that also connects to the network fabrics 710. The disclosed technique for load balancing generally executes on one or more of the controllers 704, although some systems can possibly execute the technique in other processors or controllers, such as the element manager 712 or otherwise in the management appliance 714. The controller pair 704 connects to interface loop switches 716, such as SCSI and or Fibre Channel (FC) switches.

Figure 8:
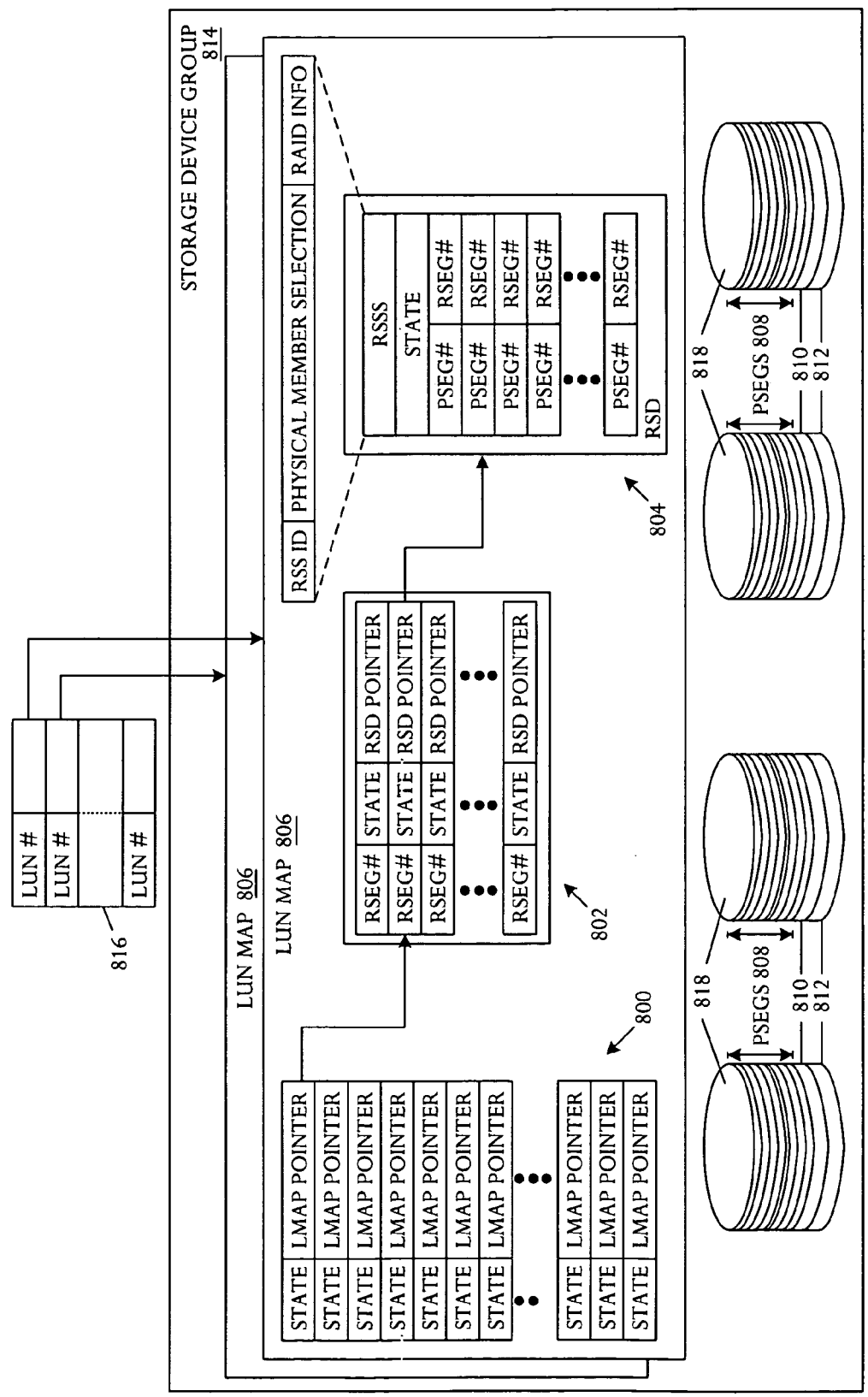
FIG. 8 is a schematic block diagram illustrating an embodiment of a storage device group including storage devices and data structures including an example of a metadata structure that can be used to manage the logical representation of virtual data.

Referring to FIG. 8, a schematic block diagram illustrates an embodiment of a storage device group 814 including storage devices and data structures including an example of a metadata structure that can be used to manage the logical representation of virtual data. In the illustrative embodiment, operations performed on metadata 810, including transfer, communication, and modification, enables creation and management of a network fabric between multiple array controllers to allocate responsibility among controllers, and move control information and/or data related to a group of storage devices between controllers and arrays without moving data.

The metadata memory representation is a mapping structure including one or more logical unit (LUN) maps 806 implemented in a memory of a controller that enables translation of a request expressed in terms of a logical block address from a host into a read/write command addressed to a particular portion of a physical storage device storing information desired to be accessed. The metadata memory representation is compact and can be stored in a reasonably small amount of memory to enable ready access in an operation that is generally contained within a single page access.

The illustrative memory representation enables a logical unit (LUN) to implement an appropriately large storage capacity, for example one megabyte to two terabytes or more, and enables each LUN to be defined with any type of Redundant Array of Independent Disks (RAID) protection, including multiple-level RAID protection or support of no redundancy. Multiple types of RAID data protection may be implemented within a single LUN.

The storage device group 814 has a storage space that is arbitrarily large from which logical storage devices, also called logical units or LUNs, are allocated. A storage pool contains one or more storage device groups, each corresponding to a set of physical storage devices 818 from which the LUNs may be allocated. Any number of storage device groups may be defined. The storage device groups operate mutually independently. A LUN is effectively a contiguous range of logical addresses that can be addressed by host devices by mapping requests from the connection protocol used by the hosts to uniquely-identified LUNs.

Hosts can perform services for other devices. For example, devices such as a client may access LUNs using a host via a network such as a local area network (LAN), wide area network (WAN), or the like.

Logical block addresses within LUNs are translated into physical segments (PSEGs) 808 through one or more tables such that the PSEGs and the tables associated with each LUN are entirely contained within one storage device group. The physical storage segments (PSEGs) 808 implementing a particular LUN are distributed across many, perhaps hundreds, of physical storage devices. Tables 800, 802, and 804 illustrate one embodiment of a table arrangement with internal structure that enables space allocation and state tracking within the storage device group. The illustrative tables include a level-two map 800, a logical map 802, and a redundancy set descriptor 804 that combine as primary data structures for mapping a logical storage device address to physical storage locations represented by the address. A single level-two map 800 handles an entire LUN or volume. Each LUN is represented by multiple logical maps 802 with the particular number depending on the actual address space that is allocated at any time. The redundancy set descriptor 804 also exists only for an allocated storage space. Other table arrangements are equally applicable so long as all of the data and maps for each LUN are entirely contained within one storage device group.

A metadata container 810 describes logical structures used to create LUNs, storage device groups, and other logical structures used by the system. A portion of the available physical storage capacity is reserved as quorum space 812 and cannot be allocated to storage device groups or used to implement LUNs. Information such as name strings or other identifying or functional information can be associated to the storage device groups and LUNs, and timestamps for object creation.

Quorum space 812 can be used to store metadata information including a physical store identifier that is unique for each physical drive, version control information, type, physical storage segment size, and state information. The metadata physical storage segment (PSEG) 808 can also contain a PSEG free list.

Metadata container 810 includes state information for each physical storage device that indicates whether the physical storage device is operating as expected, unavailable, merging wherein a missing drive has reappeared and is to be normalized before usage, replacing wherein the drive is marked for removal and data is to be copied to a distributed spare, and regenerating in which a drive is unavailable and is to have data regenerated.

A logical disk directory (LDDIR) data structure 816 in the quorum space 812 is a directory of all LUNs 806 in all storage device groups in an array. The LLDIR 816 points to multiple LUNs and identifies the location of LUNs in a storage device group. An entry in the logical disk directory is a universally unique identifier (UUID) indicating the location of a primary logical disk metadata container for that LUN. Metadata 810 specific to a particular LUN can be accessed by indexing into the logical disk directory to find tables for a particular LUN. Metadata 810 within the primary logical disk metadata container, including mapping structures, can be loaded into memory to realize the particular LUN.

A persistent copy of the memory representation shown in FIG. 8 is maintained in the primary logical storage device metadata container for each LUN 806. The memory representation of a particular LUN is realized when the system reads metadata contained in the quorum space to obtain a pointer to the corresponding primary logical storage device metadata container, then retrieves the primary logical storage device metadata container, and loads a level two map 800. The operation is performed for every LUN and typically is performed on LUN creation.

The system uses the metadata to manage storage device operations. Each request for storage access specifies a LUN and an address. A storage controller maps a logical drive specified to a particular LUN into memory if not already present in memory. Tables 800, 802, and 804 are also loaded into memory. The logical storage device address specified in the request is used as an index into the first table 800, and pointers are followed through any additional tables according to the specific structure contained within the storage device group to identify specific physical storage segments that are to participate in the storage access. Metadata information enables a controller to generate derive-specific commands to access the requested data. Accordingly, a logical storage device address is readily mapped to a set of physical storage segments that are accessed to implement the storage request.

Figure 9:
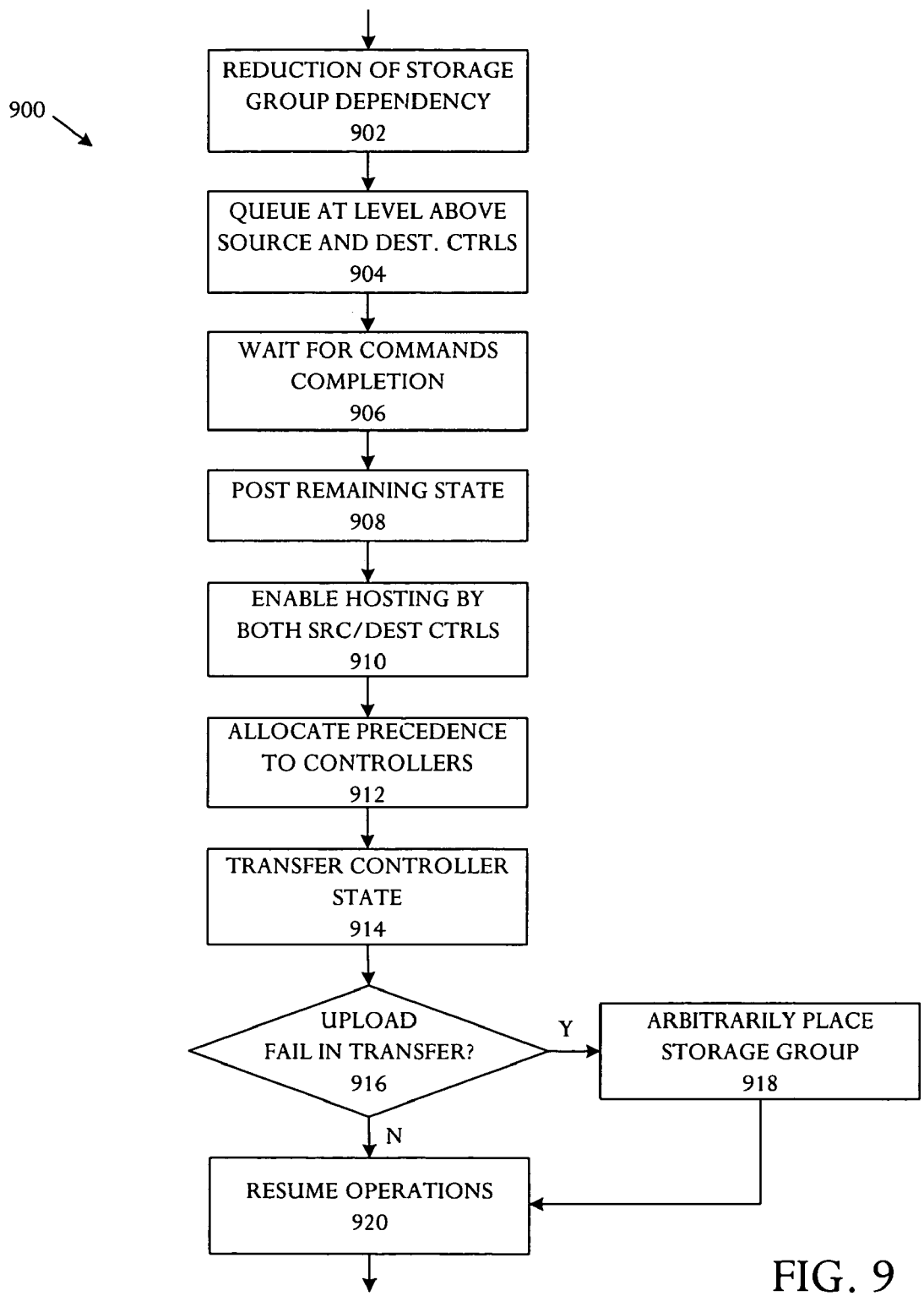
FIG. 9 is a flow chart showing an embodiment of a technique that can be used to move control and/or data between controllers and arrays without moving data.

Once control of virtual storage device groups among controllers is allocated, control information can be moved. Referring to FIG. 9, a flow chart depicts an embodiment of a technique that can be used to move control and/or data between controllers and arrays without moving data 900. In preparation for storage device group movements, elimination of as much of the storage device group dependency 902 on user data and metadata caching as possible facilitates the data movement operation. Specific operations include inhibiting usage of a write-back caching of user data, flushing caches, and inhibiting modification of metadata. Maintaining a sufficient amount of write-through user data and metadata caching ensures continued availability of the group. The cache flushing and write-back caching disablement operation assure the state of the storage device group is entirely retained on the storage devices. In an illustrative embodiment, dependency reduction 902 sufficiently separates the activity of a storage device group from the activity of the controller to enable LUN maps to be uploaded by another controller.

The system begins to queue a class of commands at a level in the system that is sufficiently high in the network fabric to enable the commands to be re-routed to a new location of the storage device group 904. The class of commands that is queued is the subset of commands that affect or modify metadata; in particular the commands that would change metadata and commands that depend on other commands that change metadata. For a typical arrangement of storage device group source and destination, commands can be queued at the level of the switches 620 shown in FIG. 6. The system waits for the commands in progress to complete 906.

The system enables a redundant state by posting any remaining storage device group state to the storage devices in the group 908. Once the state is posted, a status indication is set to indicate that the storage device group can be hosted by either the original controller or the newly-associated controller 910. The capability to host the storage device group from either controller creates an atomicity enabling recovery from failure during a move operation, resolving any problems that can result from power loss or single failures during storage device group movement. The response to power loss or single failures can be completed 912 using an appropriate precedence rule, for example simple precedence rules such as arbitrary ordering of non-failing controller pairs to determine which controller pair is defined to access the group in the event of uncertainty. Although the new controller governs access to data on all storage devices in the group, the controller pair in the same set as each storage device maintains control over other aspects of storage device management. Accordingly, access can be separate from management.

In a transfer state 914, the state of the storage device group is uploaded to the newly-associated controller, removing the indication that the previously-associated controller can access the group. If the upload fails prior to removal of the indication 916, then the storage device group is subject to arbitrary placement 918.

Operations resume 920 with resumption of command delivery to the storage device group, rerouting the commands to the new location. Commands not blocked in the re-routing action 904 are flushed from the controller that previously managed the storage group as part of the redirection. Commands are redirected, along with resumption of command delivery, to the destination locations of the storage device group move. Redirection is made at the level of the intelligent switches, for example the intelligent switches 112 shown in FIG. 1 and intelligent switches 620 depicted in FIG. 6.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, the disclosed apparatus and technique can be used in any database configuration with any appropriate number of storage elements. Although, the database system discloses magnetic disk storage elements, any appropriate type of storage technology may be implemented. The system can be implemented with various operating systems and database systems. The control elements may be implemented as software or firmware on general purpose computer systems, workstations, servers, and the like, but may be otherwise implemented on special-purpose devices and embedded systems.

What is claimed is:

1. A method of allocating control of virtual storage segments in a storage system among a plurality of controllers comprising:
   arranging the storage system as multiple sets of associated controllers and storage devices that communicate with full cross-sectional bandwidth between controllers and associated storage devices internal to ones of the multiple sets and a reduced inter-set bandwidth in inter-set links between controllers and storage devices in different sets of the multiple sets;
   determining performance demand among a plurality of storage device groups;
   distributing performance demand values according to controller processor utilization of the individual storage device groups and inter-set bandwidth utilization; and
   associating the plurality of storage device groups with controllers based on the performance demand value distributions.

2. The method according to claim 1 further comprising:
   measuring performance demand including measurements of data transfer bandwidth and/or operations executed per second.

3. The method according to claim 1 further comprising:
   estimating performance demand including enumerating performance demand as a proportion of per-storage device throughput and/or evaluating implemented upstream workload throttling parameters.

4. The method according to claim 1 further comprising:
   establishing utilization guidelines for controller processor and inter-set communication bandwidth linking storage devices in different sets of the multiple sets.

5. The method according to claim 1 further comprising:
   establishing utilization guidelines for controller processor and inter-set communication at a storage device level including guidelines for maximum utilization targets and/or equalization across controller processors.

6. The method according to claim 1 further comprising:
   administering controller memory resources as virtual slots whereby disk group related control and data are placed; and
   optimizing the allocation of controllers and storage device groups using three-dimensional bin-packing techniques with the dimensions defined as virtual slot utilization, controller processor utilization, and inter-set link utilization.

7. The method according to claim 1 further comprising:
optimizing the allocation of controllers and storage device groups using a custom heuristic algorithm.

8. The method according to claim 1 further comprising:
optimizing the allocation of controllers and storage device groups using selection from among a set of pre-planned controller to storage device group association patterns.

9. The method according to claim 1 further comprising;
determining whether a storage device group to controller allocation meets preselected criteria;
if so, allocating the storage devices groups and controllers; and
if not, indicating allocation failure and responding with one or more actions selected from among a group of actions including adding controllers, adding inter-set bandwidth, adding storage devices, and reconfiguring storage device groupings by moving data.

10. The method according to claim 1 further comprising:
optimizing the allocation of controllers and storage device groups;
determining whether the optimized allocation of storage device groups to controllers improves performance;
if so, allocating the storage devices groups and controllers; and
if not, indicating failure to improve allocation and responding with no action or one or more actions selected from among a group actions including adding controllers, adding inter-set bandwidth, adding storage devices, and reconfiguring storage device groupings by moving data.

11. The method according to claim 1 further comprising:
optimizing the allocation of controllers and storage device groups; and
planning a sequence of virtual storage segment movements that advance from a current state to the optimized state.

12. The method according to claim 1 further comprising:
moving storage device-related activity between controllers by transferring management information rather than data comprising:
 identifying a storage device group to be moved from a first controller to a second controller;
 eliminating data structures associated with the storage device group in the first controller;
 queuing commands directed to the storage device group at a level sufficiently high to include both the first controller and the second controller;
 waiting for commands directed to the storage device group to complete;
 posting any remaining storage device group state information to the storage device group;
 enabling both the first controller and the second controller to host the storage device group;
 uploading the storage device group state information to the second controller;
 when the storage device group state information is uploaded, disabling the first controller from hosting the storage device group; and
 resuming delivery of commands to the storage device group.

13. A storage system comprising:
a plurality of storage arrays configurable into a plurality of storage device groups;
a plurality of controllers selectively coupled to ones of the storage arrays;
a network fabric arranged as a linkage of multiple sets of associated controllers and storage devices that communicate with full cross-sectional bandwidth between controllers and associated storage devices internal to ones of the multiple sets and a reduced inter-set bandwidth in inter-set links between controllers and storage devices in different sets of the multiple sets; and
a processor configured to associate the plurality of storage device groups among controllers based on a distribution of performance demand according to controller processor utilization of the individual storage device groups and inter-set bandwidth utilization.

14. The storage system according to claim 13 further comprising:
a process executable in the processor that determines performance demand among a plurality of storage device groups by measuring performance demand including measurements of data transfer bandwidth and/or operations executed per second.

15. The storage system according to claim 13 further comprising:
a process executable in the processor that determines performance demand among a plurality of storage device groups by estimating performance demand including enumerating performance demand as a proportion of per-storage device throughput and/or evaluating implemented upstream workload throttling parameters.

16. The storage system according to claim 13 further comprising:
a process executable in the processor that administers controller memory resources as virtual slots whereby disk group related control and data are placed; and
a process executable in the processor that optimizes the allocation of controllers and storage device groups using three-dimensional bin-packing techniques with the dimensions defined as virtual slot utilization, controller processor utilization, and inter-set link utilization.

17. The storage system according to claim 13 further comprising:
a process executable in the processor that optimizes the allocation of controllers and storage device groups using a custom heuristic algorithm.

18. The storage system according to claim 13 further comprising:
a process executable in the processor that optimizes the allocation of controllers and storage device groups using selection from among a set of pre-planned controller to storage device group association patterns.

19. The storage system according to claim 13 wherein:
the plurality of controllers are configured as a plurality of controller pairs with a storage array having a restrictive physical association with one controller pair.

20. The storage system according to claim 13 wherein:
the plurality of storage arrays are grouped for Redundant Array of Independent Disks (RAID) style redundancy algorithms with group membership determined according to algorithms resident in a controller that is currently in control of the group.

21. The storage system according to claim 13 further comprising:
controller memory resources administered as virtual slots for placement of group related control and data.

22. The storage system according to claim 21 further comprising:
battery-backed memories included in the virtual slots; and
a process that mirrors information in the battery-backed memories from a primary controller to a secondary controller to maintain continuous data access in conditions of a controller failure event without storage device group movement.

23. The storage system according to claim 21 wherein:
at least one virtual slot sufficiently large to accommodate the largest storage device group is available when no storage device group movement is in progress.

24. The storage system according to claim 13 wherein:
a controller's internal bandwidth is sufficient to accommodate full utilization of all external bandwidth impinging on the controller.

25. The storage system according to claim 13 further comprising:
a network configured as multiple sets of associated controller pairs and storage shelves, the individual sets having a bandwidth adequate for accessing all storage arrays in the set, bandwidth between sets being limited.

26. The storage system according to claim 25 wherein:
all interaction with a storage element other than support of access to data or metadata contained on the storage element involves a controller in the same set as the storage element, support of access.

27. The storage system according to claim 13 further comprising:
a process executable in the processor that moves storage device-related activity between controllers by transferring management information rather than data comprising:
identifying a storage device group to be moved from a first controller to a second controller;
eliminating data structures associated with the storage device group in the first controller;
queuing commands directed to the storage device group at a level sufficiently high to include both the first controller and the second controller;
waiting for commands directed to the storage device group to complete;
posting any remaining storage device group state information to the storage device group;
enabling both the first controller and the second controller to host the storage device group;
uploading the storage device group state information to the second controller;
when the storage device group state information is uploaded, disabling the first controller from hosting the storage device group; and
resuming delivery of commands to the storage device group.

28. An article of manufacture comprising:
a tangible computer-readable medium having a program code embodied therein for execution on a controller for moving a virtual storage segment in a storage system from a previous location to a target location, the program code further comprising:
a code causing the controller to arrange the storage system as multiple sets of associated storage controllers and storage devices that communicate with full cross-sectional bandwidth between controllers and associated storage devices internal to ones of the multiple sets and a reduced inter-set bandwidth in inter-set links between controllers and storage devices in different sets of the multiple sets;
a code causing the controller to determine performance demand among a plurality of storage device groups;
a code causing the controller to distribute performance demand values according to controller processor utilization of the individual storage device groups and inter-set bandwidth utilization; and
a code causing the controller to associate the plurality of storage device groups with controllers based on the performance demand value distributions.

29. A storage system comprising:
a processor;
means executable on the processor for allocating control of virtual storage segments in a storage system among a plurality of controllers, the storage system being arranged as multiple sets of associated controllers and storage devices that communicate with full cross-sectional bandwidth between controllers and associated storage devices internal to ones of the multiple sets and a reduced inter-set bandwidth in inter-set links between controllers and storage devices in different sets of the multiple sets;
means executable on the processor for determining performance demand among a plurality of storage device groups;
means executable on the processor for distributing performance demand values according to controller processor utilization of the individual storage device groups and inter-set bandwidth utilization; and
means executable on the processor for associating the plurality of storage device groups with controllers based on the performance demand value distributions.

30. A storage system comprising:
a plurality of storage arrays configurable into a plurality of storage device groups;
a plurality of controllers selectively coupled to ones of the storage arrays;
a network fabric arranged as a linkage of multiple sets of associated controllers and storage devices that communicate with full cross-sectional bandwidth between controllers and associated storage devices internal to ones of the multiple sets and a reduced inter-set bandwidth in inter-set links between controllers and storage devices in different sets of the multiple sets; and
an inter-set communication linkage among the plurality of storage arrays across set boundaries.

* * * * *

UNITED STATES PATENT AND TRADEMARK OFFICE
CERTIFICATE OF CORRECTION

PATENT NO.      : 7,305,520 B2                                      Page 1 of 1
APPLICATION NO. : 10/769380
DATED           : December 4, 2007
INVENTOR(S)     : Doug Voigt et al.

It is certified that error appears in the above-identified patent and that said Letters Patent is hereby corrected as shown below:

In column 15, line 8, in Claim 9, after "comprising" delete ";" and insert -- : --, therefor.

Signed and Sealed this

Eighth Day of July, 2008

JON W. DUDAS
*Director of the United States Patent and Trademark Office*